United States Patent
Goehlich et al.

(10) Patent No.: US 10,232,957 B2
(45) Date of Patent: Mar. 19, 2019

(54) METHOD AND DEVICE FOR ATTACHING AN AIRCRAFT OR SPACECRAFT COMPONENT TO A FUSELAGE SECTION

(71) Applicant: Airbus Operations GmbH, Hamburg (DE)

(72) Inventors: Robert Alexander Goehlich, Hamburg (DE); Sven Chromik, Hamburg (DE); Ingo Krohne, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 518 days.

(21) Appl. No.: 14/937,486

(22) Filed: Nov. 10, 2015

(65) Prior Publication Data
US 2016/0130016 A1    May 12, 2016

(30) Foreign Application Priority Data

Nov. 12, 2014    (DE) .................. 10 2014 116 560

(51) Int. Cl.
*B64F 5/10*      (2017.01)
*A47C 9/02*     (2006.01)
(Continued)

(52) U.S. Cl.
CPC .................. *B64F 5/10* (2017.01); *A47C 9/02* (2013.01); *A47C 9/025* (2013.01); *B25H 5/00* (2013.01); *F16M 13/04* (2013.01)

(58) Field of Classification Search
CPC . B64F 5/10; B64F 5/0009; B64F 5/00; F16M 13/04; B25H 1/0028
See application file for complete search history.

(56) References Cited

U.S. PATENT DOCUMENTS

| 2,370,083 | A | * | 2/1945 | Smith | ................... | B64F 5/10 |
| | | | | | | 29/462 |
| 2,675,608 | A | * | 4/1954 | Vines | ................... | B64F 5/10 |
| | | | | | | 29/467 |

(Continued)

FOREIGN PATENT DOCUMENTS

| CN | 1232730 A | 10/1999 |
| CN | 102802867 A | 11/2012 |

(Continued)

OTHER PUBLICATIONS

German Patent Office, German Search Report for European Patent Application No. 10 2014 116 560.8 dated Sep. 18, 2015.

*Primary Examiner* — Jacob J Cigna
(74) *Attorney, Agent, or Firm* — Lorenz & Kopf LLP (57) ABSTRACT

This relate to a method for attaching a component to a fuselage section of an aircraft or spacecraft. In a step of the method, a rail is arranged within a fuselage section of an aircraft, which rail extends in a longitudinal direction of the fuselage section. In another step, a support structure is movably mounted to the rail such that the support structure can be moved along the rail in the longitudinal direction of the fuselage section. The support structure comprises a positioning unit for positioning a tool for attaching the component to the fuselage section at a location where the component is to be attached to the fuselage section. The embodiments also relate to a device for attaching a component to a fuselage section of an aircraft.

4 Claims, 7 Drawing Sheets

(51) Int. Cl.
*B25H 5/00* (2006.01)
*F16M 13/04* (2006.01)

(56) References Cited

U.S. PATENT DOCUMENTS

| | | | | |
|---|---|---|---|---|
| 4,033,532 | A * | 7/1977 | Bergquist | B25H 1/0028 248/324 |
| 4,243,147 | A * | 1/1981 | Twitchell | A61G 7/1015 104/172.1 |
| 4,662,556 | A * | 5/1987 | Gidlund | B21J 15/10 227/111 |
| 4,895,336 | A * | 1/1990 | Lieberman | B25H 3/006 248/328 |
| 5,363,940 | A | 11/1994 | Fahrion | |
| 5,379,701 | A * | 1/1995 | Sumi | A47C 9/022 104/89 |
| 5,661,892 | A | 9/1997 | Catania et al. | |
| 5,896,637 | A * | 4/1999 | Sarh | B23P 19/04 227/51 |
| 6,098,260 | A * | 8/2000 | Sarh | B21J 15/10 227/52 |
| 6,210,084 | B1 * | 4/2001 | Banks | B21J 15/10 29/34 B |
| 6,237,210 | B1 * | 5/2001 | Stoewer | B64C 1/00 29/243.53 |
| 6,505,393 | B2 | 1/2003 | Stoewer et al. | |
| 8,266,778 | B2 | 9/2012 | Neuhaus et al. | |
| 9,174,748 | B2 * | 11/2015 | Umlauft | B64C 1/20 |
| 9,272,373 | B2 * | 3/2016 | Meyer | G01C 15/02 |
| 2001/0054228 | A1 * | 12/2001 | Lehmker | B21J 15/10 29/701 |
| 2002/0007548 | A1 | 1/2002 | Stoewer et al. | |
| 2006/0118689 | A1 * | 6/2006 | Otten | B25H 1/0028 248/328 |
| 2010/0224098 | A1 * | 9/2010 | Gordon | A63G 7/00 104/53 |
| 2012/0066907 | A1 * | 3/2012 | Gallant | B29C 33/301 29/897.2 |
| 2013/0185925 | A1 * | 7/2013 | Sarh | B21J 15/142 29/559 |
| 2013/0192045 | A1 * | 8/2013 | Meyer | G01C 15/02 29/464 |
| 2014/0145128 | A1 | 5/2014 | Durand et al. | |
| 2015/0266147 | A1 * | 9/2015 | Reid | B23P 21/004 29/525.01 |
| 2016/0008869 | A1 * | 1/2016 | Oberoi | B29C 45/14336 411/506 |

FOREIGN PATENT DOCUMENTS

| | | |
|---|---|---|
| CN | 102905970 A | 1/2013 |
| DE | 4226501 A1 | 2/1994 |
| DE | 69829255 T2 | 1/2006 |
| DE | 102009018991 A1 | 11/2010 |
| DE | 102009034416 B4 | 6/2011 |
| DE | 102010018272 A1 | 10/2011 |
| EP | 2221151 A2 | 8/2010 |

* cited by examiner

METHOD AND DEVICE FOR ATTACHING AN AIRCRAFT OR SPACECRAFT COMPONENT TO A FUSELAGE SECTION

CROSS-REFERENCE TO RELATED APPLICATIONS

This application claims priority to German Patent Application No. DE 10 2014 116 560.8 filed Nov. 12, 2014, which is incorporated herein by reference in its entirety.

TECHNICAL FIELD

This relates generally to the manufacturing of aircraft or spacecraft fuselages. In particular, the embodiment relates to a method for attaching an aircraft component to a fuselage section of an aircraft and to a device for attaching an aircraft component to a fuselage section of an aircraft.

BACKGROUND

The assembly of aircraft fuselages is a complex task involving considerable manpower. Several tools are used for this process. Changing a tool may interrupt the workflow since the worker usually has to conduct a sequence of tasks using different tools.

U.S. Pat. No. 8,266,778 B2 describes an assembly apparatus for supporting a fuselage section of an aircraft or spacecraft in an adjustable assembly position. At least one stiffening bow for detachably stiffening the fuselage section and a rotational support is provided.

US 2014/0145128 A1 describes a method for installing a wiring harness in an aircraft. Therein, cables are secured to the harness and winding means onto each of which is wound one of the cables such that a lift up of the harness is achieved by exerting a tensile force.

SUMMARY

According to a first embodiment, a method for attaching a component to a fuselage section of an aircraft or spacecraft is provided. The component may be an aircraft or spacecraft component. In a step of the method, a rail is arranged within the fuselage section of the aircraft which rail extends in a longitudinal direction of the fuselage section. In another step of the method, a support structure is movably mounted to the rail such that the support structure can be moved along the rail in the longitudinal direction of the fuselage section. The support structure comprises a positioning unit for positioning a tool for attaching the component to the fuselage section at a location where the component is to be attached to the fuselage section.

This method provides a support system for a person for conducting an assembly process within the aircraft fuselage. In other words, the person is supported by the support structure which is mounted to the rail such that the tool which is integrated in the support structure may be brought into a position where the tool is actually needed. The support structure may be shifted along the rail, wherein the rail may either be attached to a part of the aircraft fuselage or to a part of the hangar or factory hall. In a first case, the rail may be attached to primary structural elements of the aircraft fuselage and after the rail has been attached to the primary structural elements of the aircraft, the support structure may be movably mounted to the rail and provides a means for supporting a person by doing different tasks like for instance riveting, drilling, screwing, forming, welding or by using different tools like for example pliers, screw wrenches or drills. In a second case, the rail is attached to a framework within the hangar or factory hall in which the fuselage is assembled. This means that the rail is horizontally arranged with respect to the ground of the factory hall and the fuselage is shifted onto or over the rail such that the fuselage encloses the rail during a working process in which the support structure is movably mounted to the rail and supports the person when conducting the different tasks. In a third case, the rail and/or the support structure are parts of a primary structure of the aircraft or spacecraft such that the rail and/or the support structure are not removed after the assembly process. However, the rail and/or the support structure may be used for an operation phase, e. g., during flight or during space operation. In particular, the rail and/or the support structure may be applied for automated maintenance, inspections, and other operational purposes of space stations. Advantageously, a reduction of an astronaut's workload of repeatable tasks such as cleaning filters, equipment or living areas can be achieved. Moving objects or inspections of components that typically require spacewalks outside the space station may be further applications.

The rail may be an elongated metallic structure to which also a plurality of support structures may be movably mounted. When arranging the rail within the fuselage section of the aircraft, the rail may be positioned substantially parallel to an axis of the tubular fuselage sections, e. g., parallel to the curved lateral surfaces of the tubular fuselage section. If the rail is attached to a framework within the factory hall, the rail extends into the fuselage section. In other words, the rail extends into the fuselage section like a tongue protruding into the free space which is enclosed by the tube-like shaped or tubular fuselage section. However, the rail may protrude into the fuselage section without being attached to the fuselage section. The longitudinal direction of the fuselage section describes the direction which is substantially parallel to the curved lateral surface of the tube-like elements of the fuselage section, e. g., parallel to the axis of the tubular fuselage section. The fuselage section may by a tubular fuselage section of an aircraft.

A plurality of support structures may be mounted to the rail in such a manner that tools which are a part of the support structure or are attached to the support structure may be used independently. Therefore, the support structures may be mounted to the rail such that they may be shifted or positioned independently. For example, two support structures working at the same time may be moved along the rail in an opposite direction or may even pass each other. This advantageously provides an effective production of the fuselage section to be assembled.

Furthermore, the different support structures of the plurality of support structures may work in a multimode which means that the same component may be mounted to the fuselage section by two or more different support structures, i.e. tools. For example, a first support structure may position a welding tool and a second support structure may position a riveting tool such that a simultaneous welding and riveting of the component may be conducted.

For independent moving of the support structures along the rail, the support structures may be detachably mounted to the same or to different rails being arranged in a parallel manner. If a plurality of support structures is mounted to one rail, the rail may comprise bypass areas where the support structures may pass each other.

The support structure may be an elongated structure like a robotic arm for example. The support structure may comprise a hinge bearing or several hinge bearings which connect individual parts of the support structure. The support structure may be movably mounted to the rail, for example on rollers or by a gliding mechanism. Therefore, the rail may be adapted such that the support structure may glide or roll along the rail by a guidance structure. The guidance structure may be adapted such that the support structure may only be shifted along the rail into the longitudinal direction of the rail and/or the fuselage section. Therefore, the support structure may comprise a first end which provides a means for movably mounting the support structure to the rail and a second end at which the tool is attached to the support structure. The support structure may be configured such that the tool which is attached to the support structure may reach every location within the fuselage section. The support structure may extend substantially in a transverse direction, for example perpendicular to the longitudinal direction of the fuselage section. In this manner, the walls or the shell-like structural components including the stiffening units which stiffen the shell-like structural components of the fuselage section can be reached by the tool for operation purposes. These operation purposes may for example include components which need to be attached to the fuselage section. Such components may for instance be structural components, rivets, screws, brackets or supply lines. For example, the support structure that comprises the positioning unit for positioning the tool may be a beam or a beam-like element that is pivotably and/or movably attached to the rail such that a rotation around the longitudinal direction or axis of the fuselage section may be conducted as well as a shifting of the support structure into the longitudinal direction of the fuselage section. The rail may be a T-beam, for example. Such an arrangement of the support structure provides the possibility that the tool is carried by the support structure such that the person who works in a region near or besides the support structure is supported in his workflow and does not have to carry or hold the tool while conducting the working process. Moreover, the tools may be changed via the support structure such that the person does not have to leave his working position which leads to a reduction of time required for the working process conducted. The support structure may further be configured such that it accompanies the person throughout the working process and also delivers the components or means which the person requires during his working tasks. For example, the flexible support structure provides the person with pneumatics, tools, rivets and brackets in a comfortable distance to his workstation. The weight of the tools and components is carried by the support structure that may be imagined as an octopus arm. In addition, the person may be hold by a rope or harness to improve his body posture. The support structure may therefore be automatically controlled by an external controlling unit such that the person who is fixed by the harness may be carried into an adequate position which allows the attachment of the components to the fuselage section.

With this method, it is possible to improve ergonomic factors when assembling a fuselage section which may also lead to a reduction of lead time while attaching the components to the fuselage section. The comfort factor of the person while doing his tasks is further supported by lights, toolboxes and other features which are attached to the support structure such that the person does not have to change his body posture in order to reach the tool or component which he currently requires in order to conduct his tasks. Since the tool is attached to the support structure and the support structure comprises a positioning unit such that the support structure reaches every location within the fuselage section to which a component is to be assembled, the tasks which are usually done by the person can be conducted autonomously by the support structure. These tasks include but are not limited to drilling, sinking, sealing, positioning of rivets, pulling rivets with special tools, positioning of HI-LOK fasteners, positioning of heavy pliers, bracket installation, certain riveting processes, etc. Furthermore, a lot of different materials, templates and tools which must be handled by the person may be handled by the support structure autonomously or at least partly autonomous such that the person is only supported by the support structure. Furthermore, the handling of many pneumatic hoses and switches or tools, like for instance hoses or lines which are knotted together, can be avoided.

The support structure may autonomously change the tool. For example, the support structure may replace a welding tool by a riveting tool. The autonomous change of the tool may be conducted by detaching the tool from the support structure and attaching another tool to the support structure. Therefore, the support structure may place the tool which is currently not needed into a box or on the ground and grabs the other tool which is needed for the next working task from carrying or supply unit. This carrying or supply unit may also be a box or a depot in a region where the respective working task is to be done.

According to another embodiment, the aircraft or spacecraft component is attached to the fuselage section by the tool in another step. This tool may be adapted for conducting tasks like riveting, screwing, drilling, welding, forming, etc. The tool may be connected to the support structure and/or the positioning unit of the support structure by a rope or harness. The tool may further be directly attached to the support structure and/or positioning unit. However, the tool may be attached to the support structure and/or positioning unit such that the tool may reach every location within the fuselage section. The support structure may be connected with the tool by a bearing in order to provide a rotary movement of the tool, e. g., the tool may be pivotably mounted to the support structure.

According to another embodiment, the support structure is dismounted from the rail after attaching the aircraft or spacecraft component.

For example, the support structure is only temporarily mounted to the rail within the fuselage section. The support structure may be carried or driven into the fuselage section through a cargo door. In the same manner, the support structure may be carried or driven out of the fuselage section after dismounting the support structure from the rail. In other words, the support structure and/or the rail are only installed within or attached to the fuselage section during the assembly process of the fuselage section. It may also be possible that at least the rail remains installed within the fuselage section after the assembly process. It should be mentioned that the assembly process includes the attachment of the components to the fuselage section.

According to yet another embodiment, the rail is replaced from the fuselage section after attaching the aircraft or spacecraft component in another step. The rail may be detached from the fuselage section after the component has been attached to the fuselage section by the tool. The rail may be driven or carried out of the fuselage section, for example by shifting the fuselage section away from the framework to which the rail may be attached. The framework may be permanently installed within the hangar or factory hall. It may be possible that the rail is not attached to the fuselage section. The rail may also be disassembled into several parts such that the parts of the rail may be replaced from the fuselage section through the cargo door of the fuselage section.

According to another embodiment, the support structure comprises a supply unit for supplying the tool with electrical power and/or compressed air. For example, supply lines for supplying a tool with electrical power and/or compressed air are integrated into the support structure such that a contact between such lines and the person can be avoided. The supply lines may also be integrated into the rail such that the tool which is attached to the support structure is supplied with electrical power and/or compressed air via the rail structure and the support structure. It may further be possible that the components which are to be attached to the fuselage section are delivered to the person by the rail and/or support structure. The components or the means which are needed to conduct the assembly process within the fuselage section may be delivered via the rail and/or via the support structure by boxes. In this manner, the boxes may be filled with tools, other means or the respective components outside of the aircraft fuselage and then be delivered into the fuselage section via the rail and/or via the support structure such that the person does not have to leave his working place in order to get these components, other means or tools. Furthermore, a light may be attached to the support structure in order to illuminate the location where the aircraft or spacecraft component is to be attached to the fuselage section. For example, the light always illuminates the region, in which the tool is actually located or applied by the person.

According to another embodiment, a person is fastened to the support structure by a fastening unit such that the person may use the tool to attach the aircraft or spacecraft component to the fuselage section. The fastening unit may be a rope.

For example, the person may be held or carried in a hanging position improving the body posture of the person. The tool as well as the person may be held in a hanging position by two separate ropes. However, the tool may be arranged by the positioning unit of the support structure such that the person is always able to reach the tool in order to use the tool to attach the component to the fuselage section. The person may therefore carry no weight or does not need to carry the tool or component which may be very heavy. The person may also be provided by a remote control such that the support structure to which the person is fastened by a rope may be remotely controlled. The remote control may for instance include a shifting of the support structure along the rail and the positioning of the tool and/or the person by the ropes. The remote control may further include the deliverance of the components and tools to the person which are currently needed by the person in order to attach the component to the fuselage section of the aircraft. The deliverance may be provided by the boxes which may be driven from outside of the fuselage section via the rail and/or via the support structure to the person.

If the person is fastened to the support structure, the support structure may also be moved along the rail. In other words, the person may be carried and positioned by the support structure, for example when changing a working posture or a working position. The working position or posture, and therefore also the positioning of the support structure inside the fuselage section may be specific for a certain task to be conducted during the assembly of the fuselage section.

According to another embodiment, the support structure is adapted to attach the aircraft or spacecraft component autonomously based on data representing a motion sequence of the support structure which data is generated during a self-learning procedure.

The data representing the motion sequence may be obtained during the self-learning procedure, which is conducted when the person moves the support structure manually. Different motion sequences for different working procedures may be stored, for instance, in a database such that in the autonomous mode of the support structure movement, the data representing the motion sequence provides a pre-programmed motion sequence for the autonomous movement of the support structure. In other words, the motion sequence of the support structure is memorized by, for instance, a processing unit such that the plurality of motion sequences provides a basis for an autonomous movement of the support structure. Therefore, statistical values or parameters that are specific for different working procedures may be used in order to calibrate the autonomous work of the support structure. The autonomous work of the support structure based on the learned motion sequence may also include the positioning of the tool and the operation and/or application of the tool. Hence, it is possible that the component is autonomously attached to the fuselage section by the support structure. Preferably, drilling, sinking, sealing, positioning of rivets, pulling rivets with special tools, positioning of HI-LOK fasteners, positioning of heavy pliers, bracket installation, certain riveting processes or fully automated bracket installation are also comprised by an autonomous work of the support structure.

According to yet another embodiment, the rail is attached to a floor beam of the fuselage section. For example, the rail is arranged within a cargo space of the fuselage section below or underneath a cabin floor. Thus, the rail may be arranged underneath the floor beam with respect to a vertical direction which is substantially perpendicular to the longitudinal direction and to the transverse direction. The floor beams may extend in the transverse direction of the fuselage section and the rail may extend in the longitudinal direction of the fuselage section which is perpendicular to the transverse direction of the fuselage section. The rail may only be attached to the floor beams of the fuselage section as long as the components are attached to the fuselage section. Therefore, the rail may be detached after the components have been attached to the fuselage section, e. g., after the assembly process of the fuselage section. However, the rail may be temporarily attached to the floor beam and therefore is detachably mounted to the floor beam. For example, the rail is attached to the floor beam by screw joints or plug-in connections. Preferably, the beam is attached to several floor beams of the fuselage section.

According to another aspect, a device for attaching an aircraft or spacecraft component is provided. The device comprises a rail and a support structure. The rail is configured to be arranged within a fuselage section of the aircraft. The support structure is movably mounted to the rail such that the support structure may be moved along the rail in the longitudinal direction of the fuselage section. Therein, the support structure comprises a positioning unit for positioning a tool for attaching the aircraft or spacecraft component to the fuselage section at a location where the aircraft or spacecraft component is to be attached to the fuselage section.

The device may, for instance, be temporarily arranged at or within the fuselage section. This means that the device may only be provided during the assembly process, i.e. for attaching the component to the fuselage section, and afterwards the device is removed from the fuselage section. It should be mentioned that preferably several components may be attached to the fuselage section during the assembly process. The device and/or the fuselage section may be shifted within the hangar or factory hall such that the rail at least partly extends into the fuselage section without being attached to a part of the fuselage section. In another example, the rail is directly attached to the fuselage section.

According to another embodiment, the rail is attached to a transport unit such that the rail extends into the fuselage section of the aircraft or spacecraft in order to enable the attachment of the aircraft or spacecraft component to the fuselage section.

The transport unit may include a framework within the hangar or factory hall in which the fuselage section is to be assembled. It may also be possible that the fuselage section is placed on a transport unit such that the fuselage section is moved towards the rail in order to provide the rail extending into the fuselage section. Furthermore, both the rail and the fuselage section may be attached to or placed on transport units wherein the transport units are shifted towards each other such that the rail extends into the fuselage section. During the assembly process the rail extends into the fuselage section like a tongue such that the rail is at least partly enclosed in the tubular fuselage section. The advantage is that it is not necessary to repeatedly install the required equipment for the assembly process, such as light sources, media support, etc. at every time the component is to be attached to the aircraft or spacecraft fuselage.

According to another embodiment, the device is configured to be used in a cargo space of the aircraft or spacecraft. Therefore, the height or the width or the length of the device which includes the rail and the support structure is limited. For example, the device may have a maximum height of two meters. Since the support structure may have several bearings incorporated, the support structure may adapt its shape in order to reach into regions within the cargo space which regions are limited in their accessibility by a person.

According to yet another embodiment, the aircraft or spacecraft component is selected from a group, the group consisting of a rivet, a sealing, a HI-LOK fasteners, a clamp, and a bracket.

There may also be other parts which may be attached to the fuselage section by the support structure or by the tool. These components may also be delivered via the railing and/or via the support structure to the person who works besides the support structure within the fuselage section. These components may also be delivered or supplied to the support structure when there is no person present within the fuselage section in order to assemble or attach the component to the fuselage section. For example, this is the case in the autonomous mode in which the support structure attaches the component to the aircraft fuselage, e. g., conducts the assembling process autonomously based on data representing a motion sequence which was obtained during a self-learning procedure.

The device comprises a multifunctional rail providing the possibility to actively and/or passively position a plurality of support structures and therefore also tools. Moreover, materials and components which are to be attached to the fuselage section as well as other means and tools may be supplied via the rail and/or the support structure to certain regions within the cargo space of the fuselage section where the component is to be attached, e. g., the assembly process has to be conducted. The supply may be conducted via a supply line which is integrated into the rail and/or the support structure. The rail may also provide a passive secondary function as media outlets.

The person and robotic kinematics of the support structure may work in a collaborative and/or cooperative manner. In other words, the person and automation kinematics work or operate in the same environment at the same time. Thereby, it is possible that they work just separately while sharing the space and/or that they work collaborative such that the support structure is supporting the person actively and passively. Working in a cooperative manner means, for example, that each of the support structure and the person attach a component to the fuselage section which may happen simultaneously. Working in a collaborative manner means, for example, that both the support structure and the person may attach the same component to the fuselage section simultaneously.

The rail may provide a media supply, for example the rail provides electrical power, pneumatics, and control sequences for the support structure and the tool. Moreover, a positioning actuator may be integrated into the rail or into the support structure attached to the rail so as to control the positioning unit of the support structure. The support structure and/or the supply line may be moved by the actuator as the actuator may be a part of the robotic kinematic of the support structure.

It should be mentioned that the application of the device is not limited to the cargo space or cargo deck of the aircraft. The device including the rail and the support structure may also be used for upper floor applications.

The person may be able to remotely control the whole device by the processing unit or by connecting a controller via an interface electronics. Furthermore, a plug and play block which may be connected to the device or to parts of the device may be used. Dual arm robotics applications may be realized, for example by integrating two support structures in the device. For example, the two support structures may be coupled via at least one kinematic work piece steered by the controller which is used by the person. The support structure may be used for operations like loading and attaching system parts to be installed, e. g., water tank and/or waste tank installation. The components to be attached to the fuselage section may be loaded outside the fuselage section and then moved via the rail to the required position. Afterwards, the components may either be manually or semi-automatically installed within the fuselage section. In order to enable the person to stay in his position, especially when he is inside the fuselage section applying the support structure, a supply line integrated in the rail may deliver materials, consumables, and other components or means which are required for the assembly process. These items may be transported automatically to the person, for example on request. Additionally, the supply line may feed used automation systems of the device. For example, the rail provides three independent supply lines. A first supply line supplies the support structure with electrical power and/or pneumatics, a second supply line supplies the person with the required components, materials and consumables, and a third supply line provides a support for the person when applying the tool or handling the harnesses. Therefore, the supply may also comprise a controlling of the movement of the support structure. Moreover, the device may be a modular system such that the rail may be build up in accordance to the requirements of the use-case, e. g., the length of the rail within the fuselage section may be adapted to the requirements. More supply lines and other functionalities may be integrated, e. g., metrology and/or quality control systems.

The device may at first be used during the assembly process, for example in a production phase of the aircraft or spacecraft and later on the device may be used for maintenance and inspection purposes, for example in an operation phase of the aircraft or spacecraft. Therefore, it may not be necessary to disassemble or detach the rail and/or the support structure after the respective component has been attached to the aircraft or spacecraft. However, the rail and/or the support structure may remain within the aircraft or spacecraft during operation. If the rail remains in the aircraft or spacecraft, it may be fixedly attached to the fuselage section, for example by riveting or welding. In this case, the rail including the support structure is not removed from the spacecraft or aircraft after the assembling process. The support structure may rather be used during operation of the aircraft or spacecraft, for example for maintenance and service tasks.

The aircraft may be an airplane, a helicopter or a drone. The aircraft may thus be a manned or an unmanned aircraft system. The spacecraft may be a carrier rocket, a booster, a spaceship, a satellite, or a space station.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
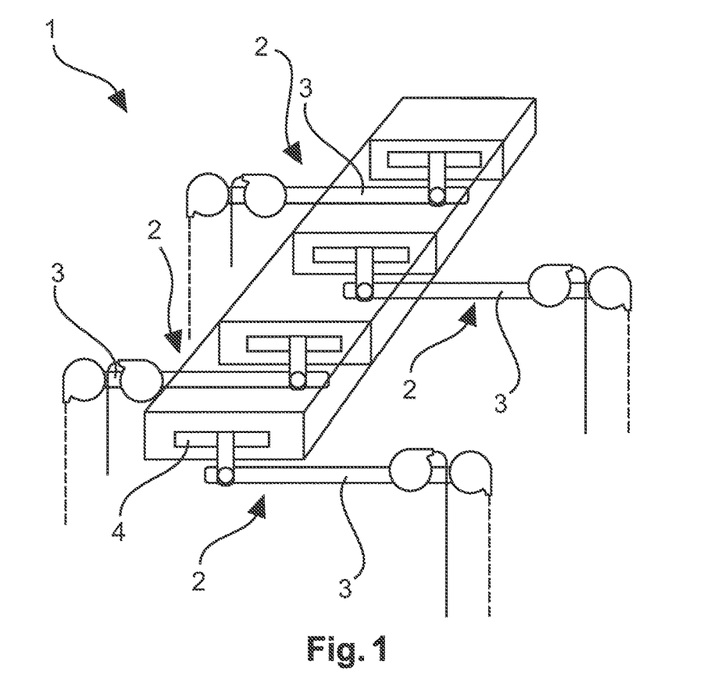
FIG. 1 shows a device for attaching a component to a fuselage section according to an embodiment.

FIG. 1 shows a device 1 for attaching an aircraft component to a fuselage section of an aircraft. The device comprises a support structure 2 which may comprise a positioning unit 3. The support structure 2 is movably mounted to a rail 4. The rail 4 may extend in a longitudinal direction within the fuselage section of an aircraft during an assembly process in which the aircraft component is attached to the fuselage section of the aircraft. Furthermore, a tool which is not depicted in FIG. 1 may be attached to the positioning unit 3. The tool may for instance be supplied with electrical power or compressed air. The supply may be conducted via the rail 4 and via the support structure 2, e. g., the positioning unit 3, such that a person that uses the tool in order to attach the component to the fuselage section of the aircraft is not interfered by the supply lines for delivering the electrical power and/or the compressed air. Therefore, the supply lines may be installed within the rail 4 and the support structure 2. The rail 4 may be a beam-like element, for instance, a T beam. The support structure 2 may be shifted along the rail 4 manually by the person and/or autonomously by a processing unit. The support structure 2 may glide or roll on the rail 4 along its longitudinal direction. The support structure may further comprise bearings or hinge elements which provide the movement of the support structure 2 into every direction within the fuselage section. In this manner, every location within the fuselage section to which the component is to be attached may be reached by the support structure 2 in combination with the rail 4. In FIG. 1, four support structures 2 are shown which are arranged in juxtaposition. However, the device 1 may comprise further support structures 2 such that the plurality of support structures 2 may support the person or may work autonomously at the same time.

Figure 2:
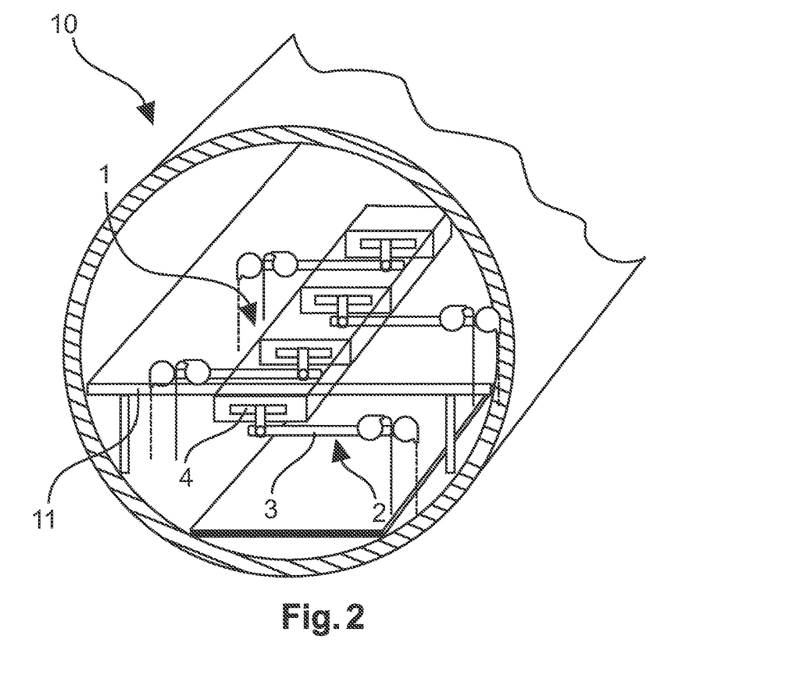
FIG. 2 shows a fuselage section with a device for attaching a component to a fuselage section according to an embodiment.

FIG. 2 shows a fuselage section 10 with a device 1 for attaching an aircraft component to the fuselage section 10. The device 1 may be arranged in a cargo space within the fuselage section 10. The rail 4 may be arranged substantially parallel to an axis of the fuselage section 10, e. g., in the longitudinal direction. This axis may be substantially parallel to the curved lateral surfaces of the fuselage section 10. The support structure 2 may extend in a transverse direction which is substantially perpendicular to the longitudinal direction. The positioning unit 3 is adapted to position the tool which is not depicted in FIG. 2 such that the person using the tool may attach the aircraft component by the tool to every location within the fuselage 10. The device 1 may be attached to a floor 11 of the fuselage section 10. The floor 11 may be the cabin floor of the fuselage section 10 of the aircraft to be assembled.

Figure 3:
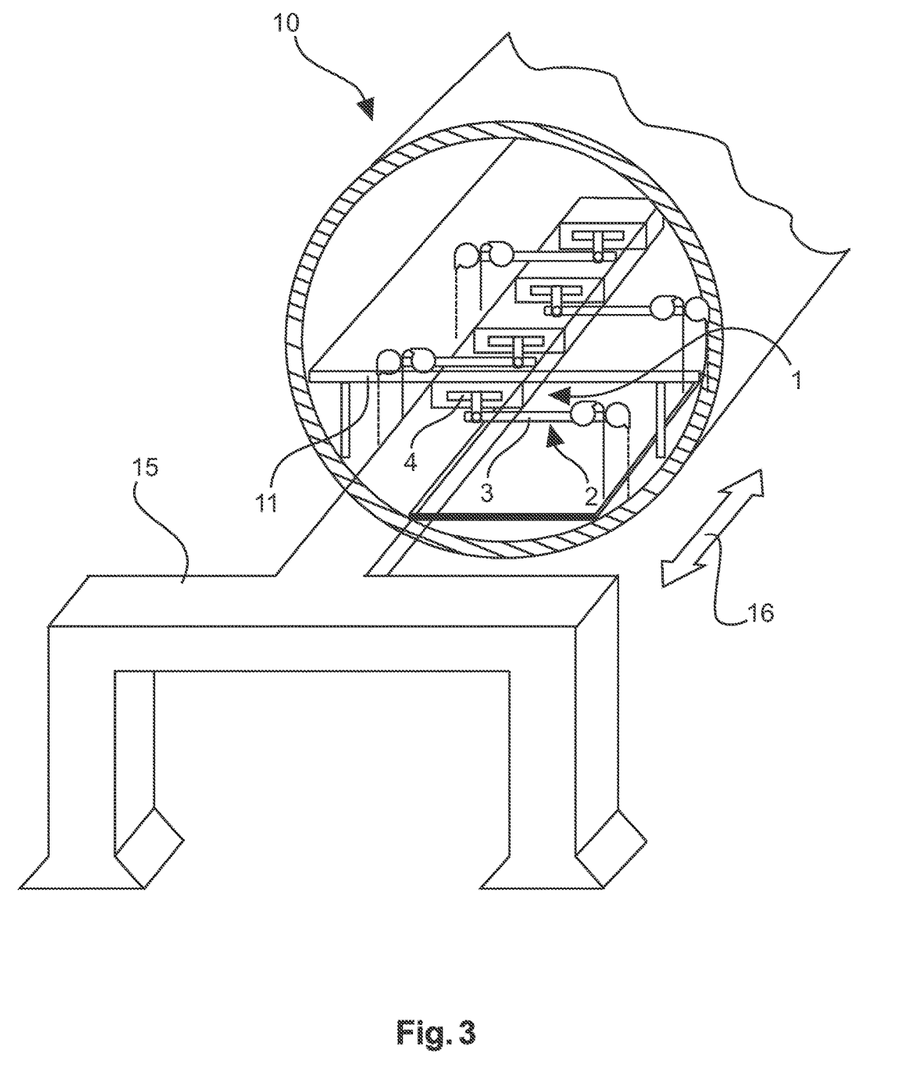
FIG. 3 shows a fuselage section with a device for attaching a component to a fuselage section and a transport unit according to an embodiment.

FIG. 3 shows the fuselage section 10 with a device 1 for attaching an aircraft component to the fuselage section 10 of the aircraft. The fuselage section 10 may be arranged within a hangar or a factory hall such that the fuselage section 10 may be shifted in the longitudinal direction of the fuselage section 10. The longitudinal direction is indicated by an arrow 16 in FIG. 3. A transport unit 15 may be fixed within the hangar or factory hall, for example on the ground of the hangar or factory hall. If the fuselage section 10 is shifted towards the transport unit 15, the rail 4 which is attached to the transport unit 15 may extend into the fuselage section 10 such that the rail 4 is arranged parallel to the longitudinal direction of the fuselage section 10. In other words, the rail 4 which is attached to the transport unit 15 is enclosed by the fuselage section 10 during the assembly process in which the person attaches the aircraft component to the fuselage section 10 while the tool is carried by the support structure 2 or the support structure 2 attaches the component to the fuselage section 10 autonomously.

It should be mentioned that the transport unit 15 may also be movably attached to the hangar or factory hall such that not only the fuselage section 10 may be shifted but also the transport unit 15 may be shifted towards the fuselage section 10 such that the rail 4 extends into the fuselage section 10.

Figure 4:
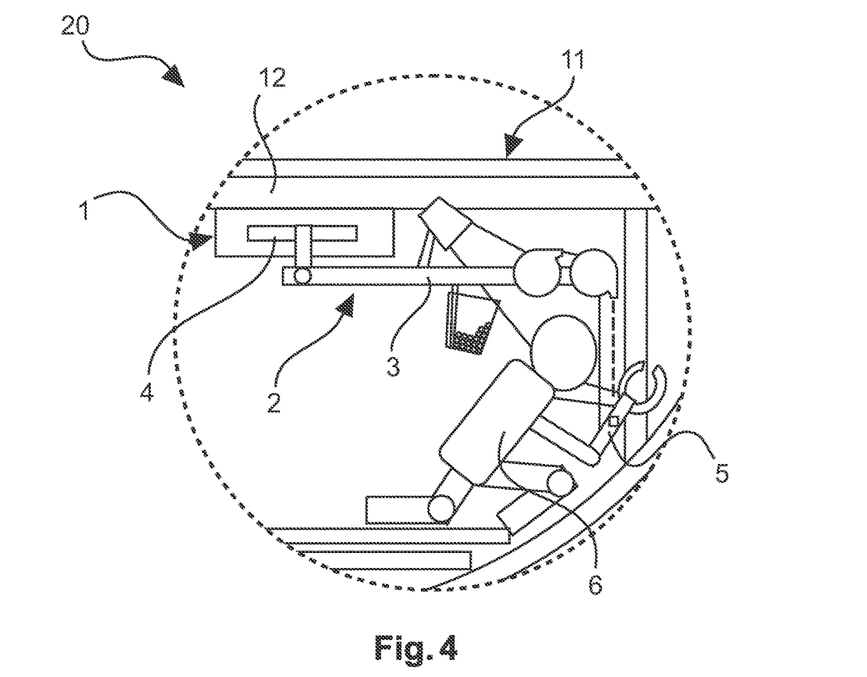
FIG. 4 shows a device for attaching a component to a fuselage section within a cargo space according to an embodiment.

FIG. 4 shows a first example 20 of a device 1 for attaching an aircraft component to a fuselage section 10 of the aircraft. The device 1 is attached to the floor beam 12 of the fuselage section. The floor beam 12 and the floor 11 of the fuselage section describe a separation between a cabin and the cargo space of a fuselage section 10 of the aircraft. FIG. 4 further shows a person 6, for example a worker 6, holding the tool 5 with which the person 6 attaches the component to the fuselage section 10. The tool may be connected to the positioning unit 3 of the support structure 2, for example, by a rope. The tool 5 may be supplied via supply lines, which are also depicted in FIG. 4, with electrical power and/or compressed air. The electrical power and/or compressed air may, for instance, be provided from a central supply unit which is connected to the tool 5 by the rail 4 and the support structure 2. Furthermore, a light may be integrated into the support structure 2 illuminating the location to which the person 6 attaches the component to the fuselage section. Moreover, the support structure may comprise a box in which means and the component which is to be assembled to the fuselage section 10 are provided. The means and components may also be delivered via the rail 4 and/or the support structure 2 to the person 6 who may easily grab the means and components from the box in order to attach the component to the fuselage section10 with the tool 5.

Figure 5:
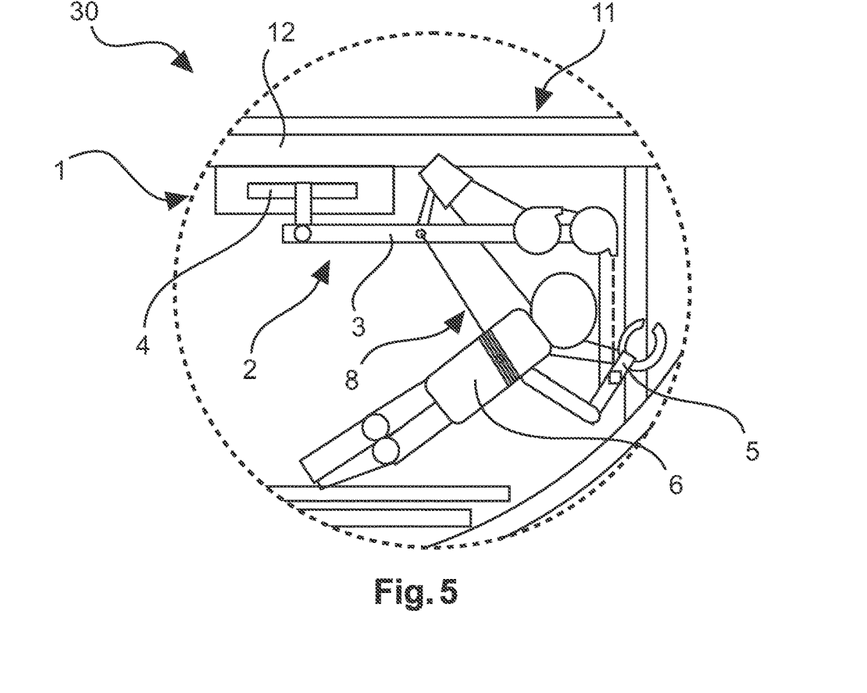
FIG. 5 shows a device for attaching a component to a fuselage section within a cargo space according to another embodiment.

FIG. 5 shows a second example 30 of a device 1 for attaching a component to a fuselage section 10. The device 1 may be attached to the floor beam 12 of the fuselage section 10. The person 6 is fastened to the support structure 2 by a fastening unit 8, which is a rope for example. The fastening unit 8 with which the person 6 is fastened at the support structure 2 is not necessarily a rope. It may for instance be a wagon or a gondola which is hanging at the support structure 2 such that the person 6 does not need to change his body posture when attaching the component to the fuselage section 10. In this manner, it is possible that uncomfortable body postures of the person 6 can be avoided. Since the support structure 2 is holding the whole weight of the tool 5, the person 6 does not need to carry the tool 5. Thus, the working comfort for the person 6 may be greatly improved.

Figure 6:
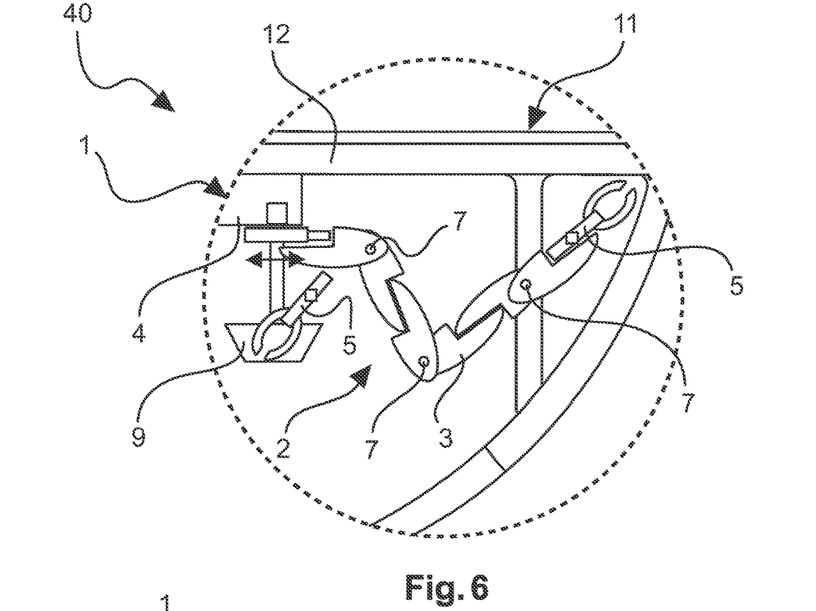
FIG. 6 shows a device for attaching a component to a fuselage section within a cargo space according to another embodiment.

FIG. 6 shows a third example 40 of a device 1 for attaching an aircraft component to the fuselage section 10. The device 1 may be attached to a floor beam 12 within a cargo space of a fuselage section 10. This configuration shows the working mode or operation mode in which the support structure 2 may conduct the attachment process of the component autonomously. The tool 5 is positioned by the support structure 2, e. g., the positioning unit 3 by a controlling unit or processing unit which is not depicted in FIG. 6. The autonomously working support structure 2 which may be imagined as a robotic arm may be supplied with tools 5 and other means which are needed for assembling or attaching the component to the fuselage section 10. The tools 5 or means may be supplied in a box 9. The support structure 2 may be adapted such that the tool 5 may be changed autonomously, for example, by reaching into the box 9 where another tool may be supplied via the rail 4. The support structure 2 may comprise a plurality of bearings 7 which enable the support structure 2 and/or the positioning unit 3 to move the tool 5 which is attached to the positioning unit 3 and/or the support structure 2 to the location where the component has to be attached to the fuselage section 10. The bearings 7 may be hinge bearings, for example.

Figure 7:
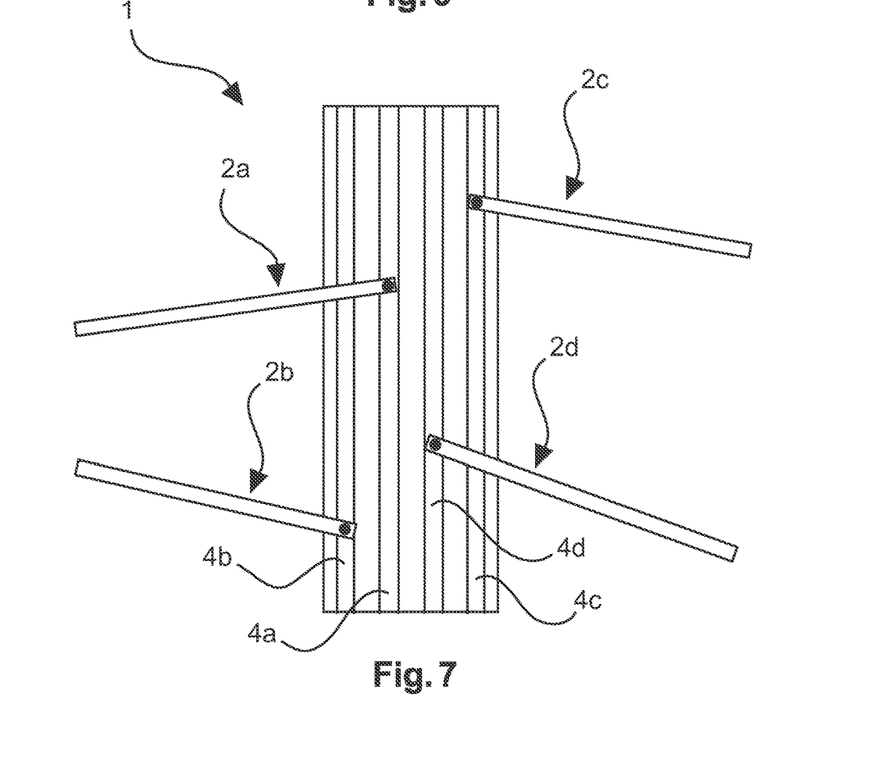
FIG. 7 shows a top view of a device for attaching a component to a fuselage section with independently movable support structures.

FIG. 7 shows a top view of a device 1 for attaching an aircraft component to a fuselage section 10 of an aircraft. Therein, four support structures 2 are shown. The support structures 2 may be moved independently along the longitudinal direction of the fuselage section 10. This may be achieved by movably mounting the support structures 2 to different rails 4. For example, a first support structure 2a is attached to a first rail 4a, and a second support structure 2b is attached to a second rail 4b. Analogously, a third support structure 2c is attached to a third rail 4c, and a fourth support structure 2d is attached to a fourth rail 4d. The rails 4 may for instance be arranged at different vertical positions which vertical positions are referred to a vertical direction which in FIG. 7 describes the viewing direction. The vertical direction may be perpendicular to the longitudinal direction into which the rails 4 extend. The vertical direction may also be substantially perpendicular to the transverse direction into which the support structures 2 substantially extend.

Figure 8:
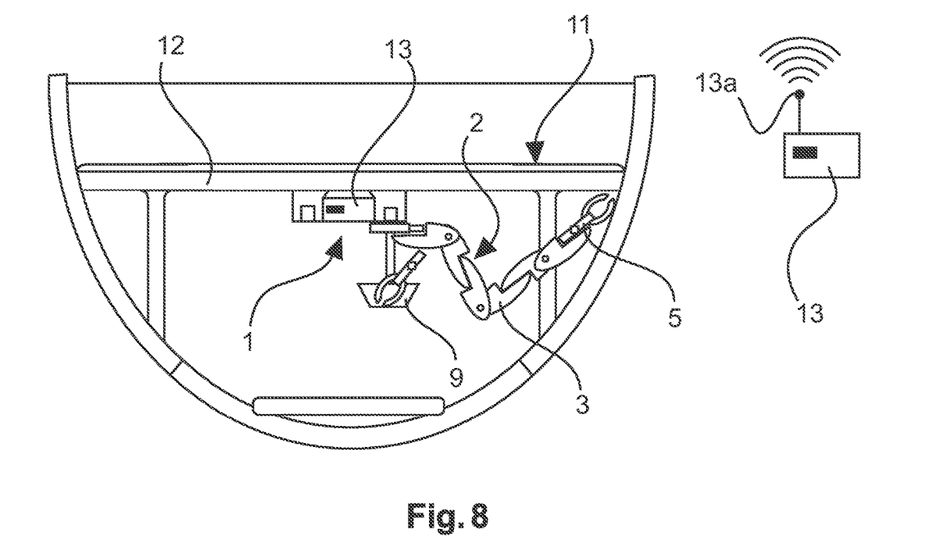
FIG. 8 shows a device for autonomously attaching a component to a fuselage section according to an embodiment.

FIG. 8 shows a fuselage section 10 in which a device 1 for attaching a component into the fuselage section 10 is attached to a floor beam 12 of the fuselage section 10. Hence, the device 1 is arranged within a cargo space of the fuselage section 10. The device 1 comprises a support structure 2 with a positioning unit 3 and a tool 5 which in this case attaches the component to the fuselage section 10 autonomously. This may be provided by a controlling unit or processing unit 13 which, for instance, is arranged at the rail 4. The processing unit 13 may also be arranged outside of the fuselage section 10 and controls the movement of the support structure 2 from outside of the fuselage section 10. The processing unit 13 may comprise a transmitting unit and/or receiving unit 13a. This transmitting and/or receiving unit 13a, the movement of the support structure 2. The controlling of the support structure 2 may be conducted wirelessly or by cable which connects the processing unit 13 to the support structure 2. The controlling, which is conducted by the processing unit 13, may include the shifting of the support structure 2 along the rail 4 in the longitudinal direction of the fuselage section as well as the movement of the positioning unit 3 in order to position the tool 5 at the location where the component is attached to the fuselage section 10. The controlling by the processing unit 13 may further provide an adjustment of the supply with electrical power and/or compressed air to the tool 5. The supply with tools 5 to the support structure 2 by the box 9 may also be controlled by the processing unit 13.

Figure 9:
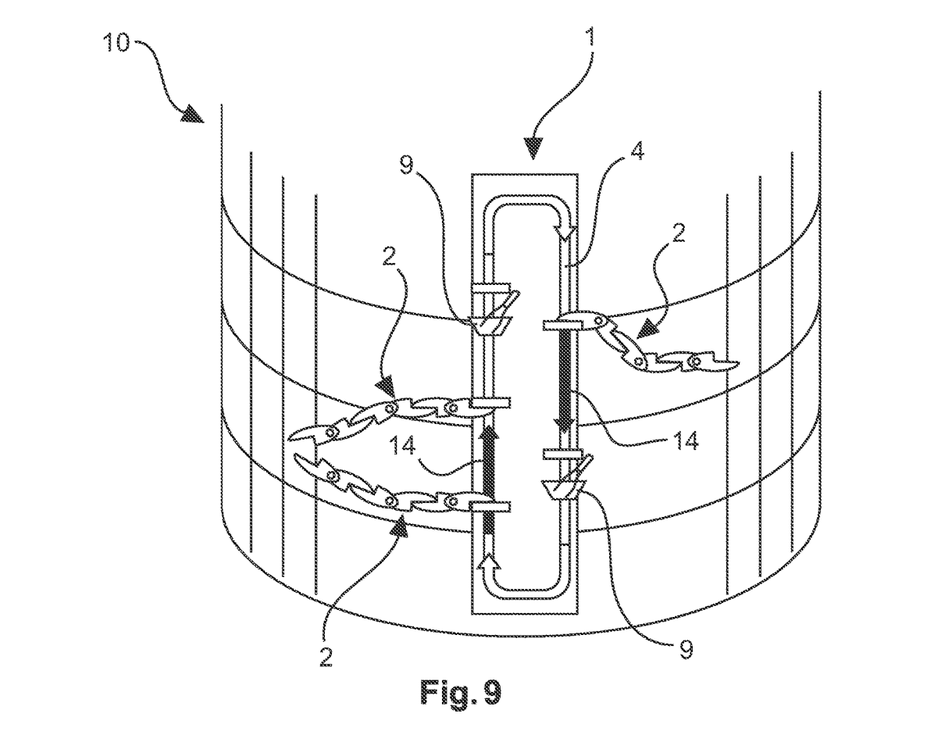
FIG. 9 shows a fuselage section with a device for autonomously attaching a component to a fuselage section according to an embodiment.

FIG. 9 shows a fuselage section 10 with a device 1 for attaching a component to the fuselage section 10 of the aircraft. The device 1 may comprise a rail which forms a closed circle such that the rail extends in both the longitudinal direction and the transverse direction. With the rail 4, three support structures 2 are movably mounted such that the support structures 2 may be moved along the rail 4, e. g., along the closed circle. Furthermore, boxes 9 in which tools 5 or components or means for assembling the component to the fuselage section 10 may be accommodated are shown in FIG. 9. The arrows 14 indicate the direction into which the support structures 2 may be shifted. With such a configuration of the rail 4, the support structures 2 may be moved into different directions. In particular, the support structures 2 may be moved in opposite directions dependent on which part of the closed circle of the rail 4, the support structures 2 are positioned. Furthermore, two support structures 2 may operate in a multimode such that two tools 5 may be used simultaneously in order to attach the component to the fuselage section 10. This means that two support structures 2 may work in a synchronized or inter-coordinated mode.

Figure 10:
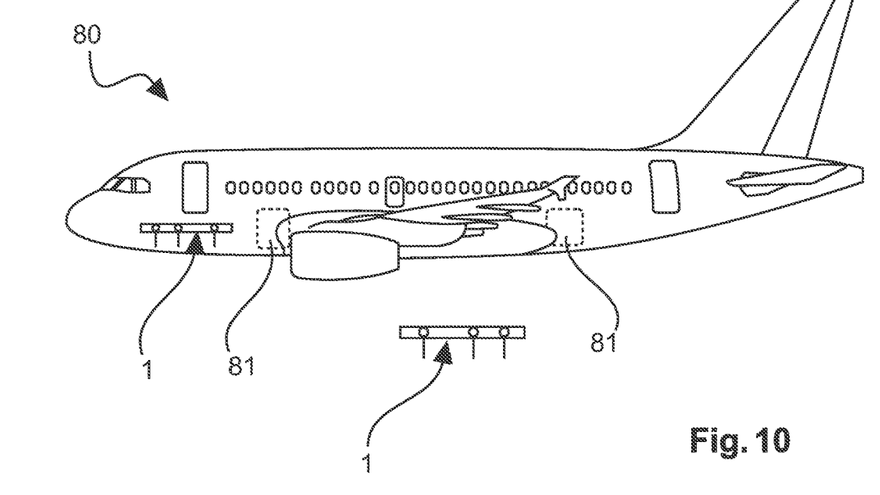
FIG. 10 shows an aircraft with a device for attaching a component to a fuselage section according to an embodiment.

FIG. 10 shows an aircraft 80 with the device 1 for attaching an aircraft component to a fuselage section 10. The device 1 is attached within the fuselage of the aircraft 80. Another device 1 is arranged outside of the fuselage of the aircraft 80. Furthermore, the fuselage of the aircraft 80 comprises cargo doors 81 through which the device 1 may be carried into the fuselage of the aircraft 80 in order to provide the means for attaching an aircraft component to the fuselage of the aircraft 80. It may be possible that the device 1 may be carried through the cargo door 81 when the device 1 is disassembled into several parts such that the device 1 is fully assembled inside the fuselage of the aircraft 80. The device 1 for attaching the aircraft component within the fuselage section 10 may be a modular system which is assembled inside a readymade fuselage of an aircraft 80. e. g., if the fuselage is already closed. For example, the rail may comprise different parts which are assembled inside the fuselage and afterwards the support structures 2 may be movably mounted to the assembled rail 4 within the fuselage of the aircraft 80. Before carrying the rail 4 out of the aircraft 80, for example through the cargo doors 81, the rail 4 may be disassembled into several parts inside the aircraft 80. The device 1 advantageously provides a modular architecture. In this manner, the device may be used for attaching the component to the aircraft fuselage in a Final Assembly Line (FAL) or only for some work stations of a Major Component Assembly (MCA). During the Major Component Assembly, the device 1 may be fixed on a jig, which in this case can be a separate transport unit 15. In the Final Assembly Line, the device may be a flexible unit which is carried through a cargo door, for example.

Figure 11:
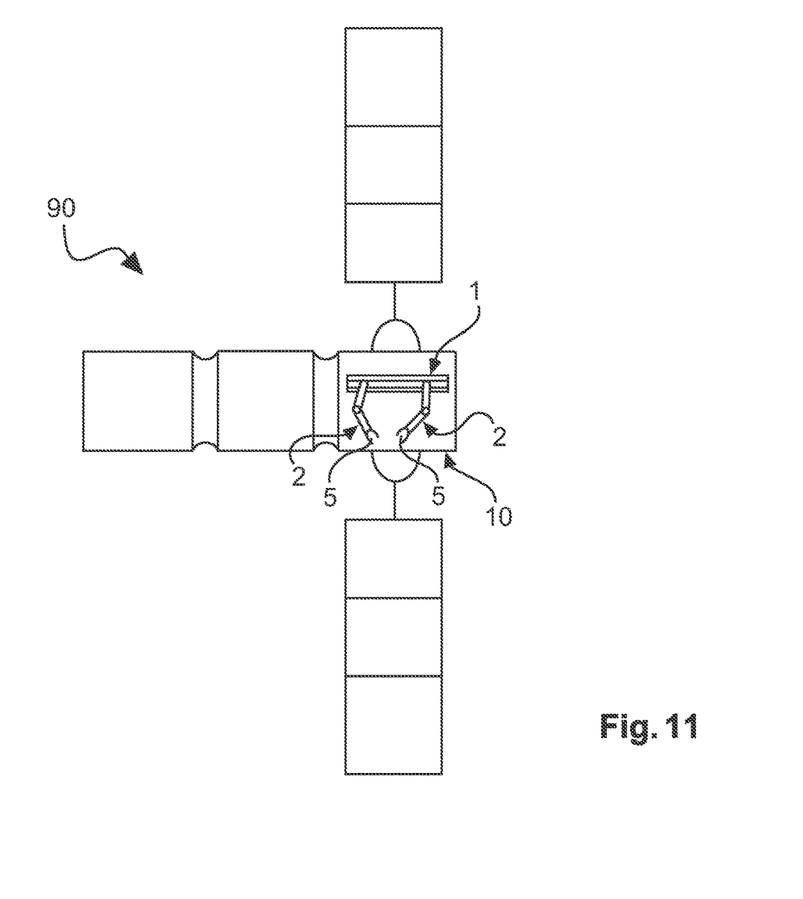
FIG. 11 shows a spacecraft with a device for attaching a component to a fuselage section according to an embodiment.

FIG. 11 shows a spacecraft 90 with a device 1 for attaching the component, which in this case may be a spacecraft component, to the fuselage section 10 of the spacecraft 90. The device 1 for attaching the spacecraft component to the spacecraft or aircraft fuselage 10 may be installed on the ground such that the support structure 2, which is comprised by the device 1, may work autonomously, for example during flight operation in space. This means that the device 1 may not be detached from the fuselage section 10 even after the spacecraft component was attached to the fuselage section 10. In other words, once the device 1 is integrated into a fuselage section 10, e. g., the device 1 is attached within the fuselage section 10, it may remain within the fuselage section 10 and conduct working tasks autonomously like, for instance, a robot arm. Moreover, the support structure may extend or reach from the inside of the spacecraft to the outside of the spacecraft, for example through an airlock of the spacecraft, such that the support structure may conduct an assembly or maintenance process outside the spacecraft. In FIG. 11, two support structures 2 with tools 5 are shown which may conduct the work within the fuselage section 10 of the spacecraft 90 during operation of the spacecraft 90, for example in space.

Figure 12:
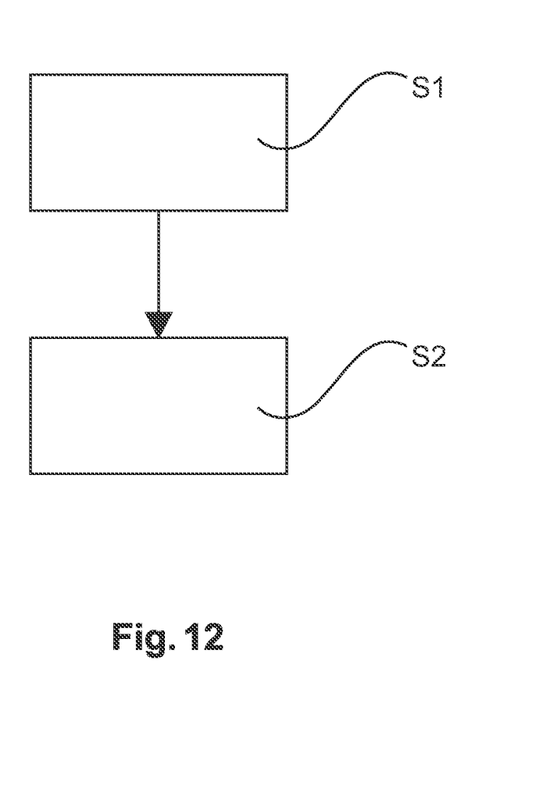
FIG. 12 shows a flow diagram of a method for attaching a component to a fuselage section of an aircraft.

FIG. 12 shows a flow diagram of a method for attaching an aircraft or spacecraft component to a fuselage section of an aircraft. In a first step S1 of the method, a rail is arranged within a fuselage section of an aircraft, which rail extends in a longitudinal direction of the fuselage section. In another step S2, a support structure is movably mounted to the rail such that the support structure may be moved along the rail in the longitudinal direction of the fuselage section. The support structure comprises a positioning unit for positioning a tool for attaching the aircraft or spacecraft component to the fuselage section at a location where the aircraft or spacecraft component is to be attached to the fuselage section. It may be possible that steps of the method may be conducted simultaneously.

The support structure may comprise a single arm, a dual arm and a multi-arm, but it may also comprise a humanoid, a hybrid robot exo-skeleton or a plurality of those.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An apparatus for attaching components to a fuselage section of an aircraft or spacecraft, the fuselage section having a longitudinal direction and a transverse direction that is perpendicular to the longitudinal direction, the apparatus comprising:
    a rail that forms a closed shape, and that is configured for being arranged within the fuselage section such that the rail extends in both the longitudinal direction and the transverse direction;
    a plurality of support structures movably mounted to the rail such that the plurality of support structures are independently moveable along the rail in the longitudinal direction and the transverse direction of the fuselage section;
    a supply unit for supplying the tool with electrical power and/or compressed air; and
    supply lines for the electrical power and/or compressed air, the supply lines integrated into the plurality of support structures;
    wherein each support structure is pivotably attached to the rail for rotational movement, and comprises a positioning unit for positioning a tool for attaching a component to the fuselage section at a location where the component is to be attached to the fuselage section, the positioning unit comprising at least one hinged arm;
    wherein the support structure comprises a fastening unit for fastening a person to the support structure such that the person can use the tool to attach the component to the fuselage section; and
    wherein, when the person is fastened to the support structure, the person is able to reach the tool such that the support structure and the person are enabled to collaboratively attach the component to the fuselage section.

2. An apparatus according to claim 1, further comprising:
    a transport unit to which the rail is attached such that the rail extends into the fuselage section of the aircraft or spacecraft in order to enable the attachment of the component to the fuselage section.

3. An apparatus according to claim 1, wherein the apparatus is configured for being used in a cargo space of the aircraft or spacecraft.

4. An apparatus according to claim 1, wherein the component is selected from a group, the group consisting of a rivet, a sealing, a HI-LOK fastener, and a bracket.

* * * * *